D. E. EATON.
Rake
No. 51,893.
Patented Jan. 2, 1866.
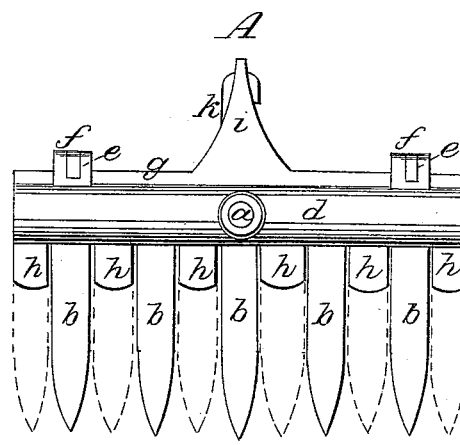
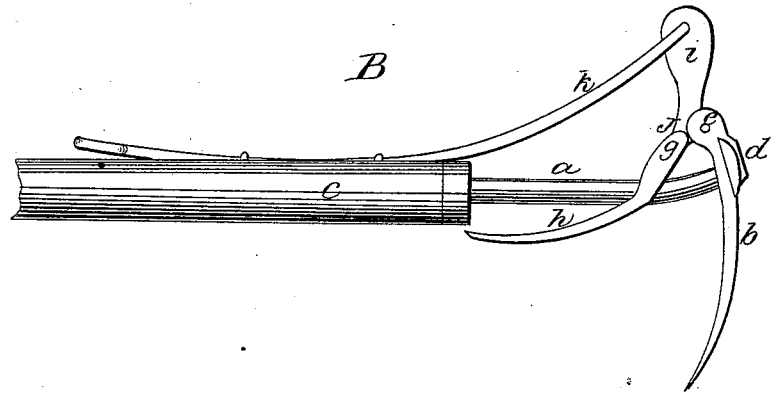
Witnesses.
F. Gould
G. L. Roberts
Inventor.
Daniel E. Eaton
By his Atty
W B Crosby

UNITED STATES PATENT OFFICE.

DANIEL E. EATON, OF BOSTON, MASSACHUSETTS, ASSIGNOR TO HIMSELF AND JOSEPH W. FOWLE, OF SAME PLACE.

IMPROVEMENT IN GARDEN-HOES.

Specification forming part of Letters Patent No. 51,893, dated January 2, 1866.

*To all whom it may concern:*

Be it known that I, DANIEL E. EATON, of Boston, in the county of Suffolk and State of Massachusetts, have invented an Improved Garden-Rake; and I do hereby declare that the following, taken in connection with the drawings which accompany and form part of this specification, is a description of my invention sufficient to enable those skilled in the art to practice it.

The invention relates, chiefly, to the construction of hand-rakes for weeding purposes; and it consists in combining, with a series of teeth made and applied to the handle in the ordinary manner, of another series of teeth, made movable with respect to the first series, and so applied that they may be fixed in position between and in line with the main teeth, or may be swung up therefrom, so as to leave the stationary or primary teeth in the form and condition of an ordinary rake.

An implement embodying the invention is represented in the drawings, A showing an end elevation, and B a side view, of the same.

$a$ denotes the shank, to which the teeth $b$ and handle $c$ are fixed in the ordinary manner. The tooth-bar $d$ of the teeth $b$ has ears or projections $e$ applied to it, to which are hinged projections $f$ of a tooth-bar, $g$, carrying a series of teeth, $h$. The bar $g$ has an arm, $i$, to which is connected a stiff wire or rod, $k$, which extends along the handle, and serves to operate the bar $g$ to swing the teeth $h$ down into line with and between the main teeth $b$, as shown by dotted lines in Figure 1, or up from and out of line with the same, as seen in Fig. 2. When the two series of teeth are out of line the implement may be used as a common rake, and when brought into line the space at the points between each two adjacent teeth serves to catch the stems and leaves of weeds and uproot them as the rake is drawn over the surface of the ground.

When the teeth become charged with weeds the rake may be cleared from the same by swinging the movable teeth away from the main teeth, as will be readily understood.

When the two series of teeth are in line the rake may also be used as a garden-hoe.

The implement thus constructed is particularly useful in dressing garden-walks and removing weeds therefrom.

I claim—

The combination of the two series of teeth, arranged to operate substantially as set forth.

In witness whereof I have hereunto set my hand this 29th day of September, A. D. 1865.

DANIEL E. EATON.

Witnesses:
F. GOULD,
W. B. GLEASON.